United States Patent
Schlösser et al.

(10) Patent No.: US 7,560,063 B2
(45) Date of Patent: Jul. 14, 2009

(54) THERMOFORMING INSTALLATION FOR PRODUCING SHAPED BODIES MADE OF PLASTIC FILM, AND METHOD FOR PRODUCING THE SAME

(75) Inventors: Helmut Schlösser, Wachtberg (DE); Peter Asselborn, Bergisch Gladbach (DE)

(73) Assignee: Kuhne Anlagenbau GmbH, St. Augustin (DE)

( * ) Notice: Subject to any disclaimer, the term of this patent is extended or adjusted under 35 U.S.C. 154(b) by 819 days.

(21) Appl. No.: 10/512,259

(22) PCT Filed: Apr. 17, 2003

(86) PCT No.: PCT/EP03/04029

§ 371 (c)(1), (2), (4) Date: May 11, 2005

(87) PCT Pub. No.: WO03/099541

PCT Pub. Date: Dec. 4, 2003

(65) Prior Publication Data

US 2005/0230873 A1 Oct. 20, 2005

(30) Foreign Application Priority Data

| Apr. 25, 2002 | (DE) | ................. 102 18 486 |
| Apr. 25, 2002 | (DE) | ................. 102 18 511 |
| Apr. 25, 2002 | (DE) | ................. 202 06 600 U |
| Apr. 25, 2002 | (DE) | ................. 202 06 601 U |

(51) Int. Cl.
*B29C 51/22* (2006.01)
*B29C 51/44* (2006.01)

(52) U.S. Cl. ................. 264/550; 425/289; 425/398; 425/444

(58) Field of Classification Search ................. 264/550; 425/289, 398, 444
See application file for complete search history.

(56) References Cited

U.S. PATENT DOCUMENTS

| 2,282,423 | A | | 5/1942 | Kopitke |
| 4,105,736 | A | | 8/1978 | Padovani |
| 6,135,756 | A | | 10/2000 | Arends |
| 6,558,150 | B1 | * | 5/2003 | Karbach ................. 425/398 |
| 6,712,599 | B2 | * | 3/2004 | Schlimgen et al. ......... 425/409 |

FOREIGN PATENT DOCUMENTS

DE 2146217 3/1973

(Continued)

OTHER PUBLICATIONS

Examination report for DE 102 18 511.5-16 (in German).

*Primary Examiner*—Robert B Davis
(74) *Attorney, Agent, or Firm*—The Nath Law Group; Jerald L. Meyer; Stanley N. Protigal

(57) ABSTRACT

The present invention relates to a thermoforming apparatus (1) for producing shaped bodies (114) of plastic sheet (50), such as cups, containers, lids, secondary packagings for foodstuffs or the like, which comprises a forming station with a two-part forming tool (20). The two-part forming tool (20) comprises an upper tool table (28) adapted to be adjustably fixed and having an upper tool (30) with pre-stretch means (92) movably mounted therein, and a movable lower tool table (32) having a lower tool (34) with cavities (112). The movable lower tool table (32) is guided through the intermediary of guide means (42) and capable of being approached to the upper tool table (28) and moved away from it. The guide means (42) in accordance with the invention for the first time include a rotatable guide rail assembly (40) whereby the lower tool table (32) may be guided rectilinearly and rotated together with it. Moreover the present invention relates to a method for manufacturing the shaped bodies (114) of plastic sheet (50).

15 Claims, 7 Drawing Sheets

FOREIGN PATENT DOCUMENTS

| DE | 33 46 628 A1 | 7/1985 |
| DE | 197 16 655 A1 | 10/1998 |
| DE | 199 48 768 C1 | 3/2001 |
| EP | 1 314 536 A1 | 5/2003 |
| JP | 60115419 A | 6/1985 |

* cited by examiner

THERMOFORMING INSTALLATION FOR PRODUCING SHAPED BODIES MADE OF PLASTIC FILM, AND METHOD FOR PRODUCING THE SAME

The present invention relates to a thermoforming apparatus for producing shaped bodies of plastic sheet, such as cups, containers, lids, food packagings or the like, comprising a forming station with a two-part forming tool, in accordance with the preamble of Claim 1, as well as a method for producing such shaped bodies in accordance with the preamble of Claim 14.

Thermoforming apparatus have in practice become known in different variants and embodiments. For manufacturing container-type articles or shaped bodies of thermoplastic material, a two-part forming tool is used. One forming tool half, the so-called upper tool, is attached to the upper tool table and generally connected, together with the latter, with the frame or stand of the thermoforming apparatus in an adjustably fixed manner, so that the upper tool may be adjusted to the respective shaped body to be produced. The other forming tool half, the so-called lower tool, is movably guided in the frame or stand of the thermoforming apparatus.

In order to form the shaped bodies, the forming tool halves, i.e., the upper and lower tools, are arranged in a mutually facing, closed position. Between the upper and lower tools a plastic sheet is arranged which is usually pre-heated and thus has good ductility, and which is mostly supplied intermittently from a supply reel in the form of a sheet web.

During the deep-drawing step, the plastic sheet is clamped between the upper and lower tools and thus immobilized. Then the plastic sheet is pressed into the cavities of the lower tool by the pre-stretch means of the upper tool, while the rim of the shaped body to be produced continues to be clampingly retained between the upper and lower tools. By generating a vacuum in the cavities, or by injection of air, the sheet applies itself against the inner walls of the cavities in the lower tool and thereby assumes the desired shape.

After sufficient cooling of the plastic sheet through contact with the tool surface, which may optionally be cooled actively, the shaped bodies are severed from the plastic sheet. To this end, the lower tool is moved upwards by about the amount of the sheet thickness. Corresponding cutting edges of the two-part forming tool cut the individual shaped bodies from the sheet web. The remaining sheet matrix is, in turn, usually supplied intermittently to a reeling unit.

In order to remove the shaped bodies from the cavities, the lower tool is subsequently moved away from the upper tool while being rotated about its longitudinal axis such that the lower tool faces a stacking means, and the shaped bodies may thus be transferred to the stacking means.

Examples for the above discussed thermoforming apparatus as known from practice are described, e.g., in U.S. Pat. No. 6,135,756 or DE 33 46 628 A1.

These known thermoforming apparatus do, however, have the essential economical drawback of only low cycle frequencies in the order, e.g., of up to 30 cycles per minute being achievable. Higher cycle frequencies are not possible without damage to the moved components. These low cycle frequencies are, however, not acceptable any more in view of the cost pressure nowadays prevailing.

Another drawback are the drive mechanisms employed in the known thermoforming apparatus, as well as the guide means for the lower tools used there.

The thermoforming apparatus described in DE 33 46 628 A1 specifically operates with a two-part forming tool, with the upper tool being fixedly attached to the stand, and the lower tool being movable. For opening and closing, the lower tool is aligned towards the upper tool and away from it and at the same time towards a stacking means, and oriented away from the latter back to the upper tool in a combined lifting and rotating movement. The lifting and rotating movement of the lower tool is produced by a cam disc/toggle joint drive. Hereby the lower tool is to be displaced vertically and at the same time rotated about its own longitudinal axis.

The combination of a toggle joint mechanism in conjunction with a cam disc drive employed in the thermoforming apparatus known from DE 33 46 628 A1 has a very complex configuration. Even the cam disc drive mechanism itself already exhibits the inherent drawback that it is only capable of transmitting limited forces. In addition, high cycle frequencies cannot be achieved with a cam disc drive mechanism. Cam disc drive mechanisms furthermore tend to wear rapidly, so that they have to be maintenanced frequently, which raises the operating costs of such a thermoforming apparatus in an unacceptable degree. Moreover the presently discussed thermoforming apparatus in accordance with DE 33 46 628 A1 and its complex toggle joint mechanism includes another group of components which inherently also only allows for low cycle frequencies.

One further drawback of this known thermoforming apparatus resides in the fact that the process of trimming the completed shaped bodies from the plastic sheet consumes comparatively much time while being effected rather in a cutting or even squeezing manner, so that the respective cutting edges of the two-part forming tool are worn rapidly. This in turn increases the maintenance expenses, which again has a negative effect on the operating costs. An increase in the trimming velocity, such as to be able to reach die-cutting velocities, for example, inherently is not possible in the thermoforming apparatus discussed in DE 33 46 628 A1. Limiting elements in this respect are the cam discs which have to generate the complex overall movement of the lower tool and also its additional lifting movement for trimming out the completed shaped bodies. If it were desired to raise the trimming velocity, those cam portions of the cam disc controlling the trimming movement would have to be designed to be substantially shorter, i.e., the associated angular segment of the cam disc would have to be made smaller, which does, however, result in extremely unfavorable conditions in terms of actuating forces, and thus in an intolerable increased strain to components. Cam discs strained like this would thus constantly have to be maintenanced or even replaced, which again unacceptably raises the operating costs. As a result, the cam discs of DE 33 46 628 A1 define an upper limit not only for the achievable cycle frequencies but also for the trimming velocity.

The thermoforming apparatus in accordance with U.S. Pat. No. 6,135,756 specifically also comprises a two-part forming tool. The guide means is here, as well, combined with the drive means of the lower tool table, or lower tool, and generates a combined lifting and rotating movement of the lower tool through the intermediary of a cam disc crank drive. The thermoforming apparatus in accordance with U.S. Pat. No. 6,135,756 includes two cam disc crank drives arranged on respective outer end faces of the lower tool. The lower tool has at its outer sides three journals each, which move in the associated grooved cams or guide tracks on the stand, respectively. The grooved cams have an extremely complex geometry and are adapted such that during opening of the forming tool, the lower tool may be moved downwardly away from the upper tool and rotated in order to be able to orient it towards a stacking means and again rotate it away from the latter.

Inasmuch as the complex geometry of the grooved cams and guide tracks is not suited for transmitting the forces necessary for trimming the finished shaped bodies from the plastic sheet, additional cam discs are provided for transmitting the respective necessary forces.

In comparison with DE 33 46 628 A1, this allows to achieve slightly higher trimming velocities. The required high trimming velocities for die-cutting the shaped bodies from the plastic sheet can, however, not be achieved. The trimming step as before takes place by cutting or squeezing.

On the other hand, the cam discs of U.S. Pat. No. 6,135,756 are subjected to substantially higher loads in comparison with DE 33 46 628 A1. Accordingly this results in premature wear of these components. This necessitates considerable maintenance work and has a negative effect on operating costs. Owing to the unfavorable conditions in terms of transmitting forces, there is still a possibility of the cam discs breaking before their time and then having to be replaced. This results in a standstill of the thermoforming apparatus, with production coming to a complete halt.

Apart from this, the high cycle frequencies nowadays demanded are impossible with the geometrically complex guide tracks that may only be adapted to each other with great difficulty. Moreover it is not possible to transmit sufficiently high forces by such guide tracks because the guide pins must serve for transmitting not only the forces for lifting and lowering the lower tool, but also the forces for accelerating, decelerating and tilting or rotating them. Large-sized tools having a number of cavities that meets present-day demands cannot be realized with the teaching of U.S. Pat. No. 6,135,756, for with an increasing size the weight of the lower tool also increases, so that the forces then necessary for the above mentioned movements cannot be transmitted any more.

Furthermore the complex geometry of the plurality of guide tracks necessitates their constant maintenance, for owing to the high forces, these may easily be damaged, worn out, or lose the demanded running accuracy.

Moreover these complex guide tracks present the additional drawback that correct matching of the lower tool during the closing movement towards the upper tool cannot be ensured. Correctly matching the lower tool with the upper tool is, however, an essential precondition for the repeatable manufacture of dimensionally accurate shaped bodies, particularly at high cycle frequencies, in order to avoid undesirable scrap.

In view of the above, it is an object of the present invention to improve known thermoforming apparatus in such a way that substantially higher cycle frequencies may be achieved, and an economical operation of thermoforming apparatus thus improved becomes possible. Moreover it is an object of the present invention to propose an economical method for producing shaped bodies of plastic sheet.

What is proposed in accordance with the invention is a thermoforming apparatus for producing shaped bodies of plastic sheet, such as cups, containers, lids, food packagings or the like, comprising a forming station with a two-part forming tool. The two-part forming tool comprises an upper tool table adapted to be adjustably fixed and having an upper tool with pre-stretch means movably mounted therein, and a movable lower tool table having a lower tool with cavities. The movable lower tool table is guided through the intermediary of guide means and capable of being approached to the upper tool table and moved away from it by drive means.

Here it is provided for the first time that the guide means include a rotatable guide rail assembly whereby the lower tool table may be guided linearly, or rectilinearly, and rotated together with it. Thus the lower tool table may advantageously perform a clearly defined rectilinear lifting movement without at the same time having to perform a rotating movement about its own longitudinal axis in the disadvantageous manner known from the prior art.

The rotating movement of the lower tool for ejecting the completed shaped bodies is, in accordance with the invention, advantageously achieved through the capability of rotating the guide rail assembly without the lower tool table having to be rotated relative to itself, e.g., about its longitudinal axis. This advantageously ensures that the lower tool may be supplied correctly to the upper tool in each lifting movement towards the latter, and thus repeatably matched in an accurate position, so that the lower tool will always contact the upper tool in the same way.

Rotatability of the guide rail assembly in combination with uncoupling the rotating movement from the linear lifting movement furthermore provides the advantage that the repeating accuracy of the axial or rectilinear lifting movement of the lower tool is neither falsifyingly superseded nor impaired in any other negative manner by the rotating movement. Moreover, when the lower tool is in the lowered condition, or in the condition removed from the upper tool, it may be rotated out of the frame of the thermoforming apparatus and accurately aligned with a stacking means through the intermediary of the rotatable guide rail assembly. Advantageously the lower tool with the finished shaped bodies located therein may thus optimally be aligned in this position relative to the stacking means, matched with the latter, and optionally moved towards and/or away from it, again in an advantageous linear movement.

Furthermore the novel guide means with a rotatable guide rail assembly provide the additional advantage that the lower tool with known and correspondingly perfected coupling members may be mounted in an axially movable manner or guided rectilinearly between the guide rails of the rotatable rail assembly, so that the only forces that must be absorbed by the coupling members are guiding forces, and the actual movement-generating forces for the lifting movement towards the upper tool and away from it, as well as for a die-cutting movement, may be transmitted to the lower tool table via a drive mechanism acting directly on the lower tool table, so that the guiding mechanism of the lower tool table advantageously is no more subjected to these high forces. In this way, any desirable high forces may be transmitted directly to the lower tool table without the risk as known from the prior art, such as inevitable wear or even breakage of the prior-art combinations of cam discs and guide pins running in guide rails that are subjected to the entire drive force.

In a preferred embodiment of the thermoforming apparatus in accordance with the invention, the rotatable guide rail assembly of the guide means for the first time includes two rotatable guide rails linked to a frame of the thermoforming apparatus, wherebetween the lower tool table is guided so as to be capable of being linearly, or rectilinearly, approached towards the upper tool table and moved away from it. In accordance with a further preferred embodiment of the thermoforming apparatus in accordance with the invention, the drive means for the lower tool table have the form of a crankshaft drive mechanism.

Hereby symmetrical guidance of the lower tool table is achieved. This advantageously results in a particularly accurate lifting movement of the lower tool table. As the lower tool table is guided on both sides, it may not only be aligned and guided correctly in parallel with the upper tool table, but moreover this advantageously brings about the additional synergy effect of centrally driving the tool table up and down, or towards the upper tool and away from it, from below in its center through the intermediary of the drive means having the form of a crankshaft drive mechanism. Moreover the crankshaft drive mechanism may advantageously also attack in several locations at the lower tool table via suitable coupling means, so that maximum possible forces may be transmitted to the lower tool table at minimum flexure or deformation thereof.

The crankshaft drive mechanism provides the major advantage of a cycle frequency theoretically having no upper limitations. With the crankshaft drive mechanism it is for the first time possible to readily realize cycle frequencies of 40 cycles, 50 cycles, or substantially more cycles. Here the linear or rectilinear movement of the lower tool table is synergistically utilized in combination with the crankshaft drive mechanism so as to attain such high cycle numbers for the first time.

This motion principle is known from the reciprocating internal combustion engine where, however, the pressing force generated by the explosion of the compressed fuel mixture is inversely transmitted by the rectilinear up-and-down movement of the reciprocating piston to a connecting rod and from the latter to a crank shaft, to achieve a rotary movement of the drive train and thus of the vehicle's wheels. In the present invention, an externally impressed rotary movement is for the first time converted via the crankshaft drive mechanism into a linear lifting movement, so as to be capable for the first time to drive the lower tool of a thermoforming apparatus on the one hand with sufficiently high forces and on the other hand sufficiently rapidly, so as to achieve cycle frequencies of 40 cycles, 50 cycles, or more. Such high cycle frequencies had hitherto been thought unattainable.

Moreover the inventive combination of a crankshaft drive mechanism combined with a linear or rectilinear guidance of the lower tool table provides the additional advantage of extremely low wear in comparison with the known thermoforming apparatus, so that the operating costs of the thermoforming apparatus in accordance with the invention may be lowered decisively, and down times may moreover be avoided. Thus it is not only possible to clearly raise the output of a thermoforming apparatus in accordance with the invention, but at the same time to attain an altogether positive cost-efficiency ratio by reducing the operating expenses thanks to a particularly reliable design.

In accordance with a further preferred embodiment of the thermoforming apparatus in accordance with the invention, the crankshaft drive mechanism is positioned inside the frame of the thermoforming apparatus at the side of the lower tool table facing away from the upper tool table, such that the center point of the crank shaft axis, the center point of the eccentric axis portion thereof in the upper reversing point, the linking points of the rotatable guide rails, and the linking points at the lower tool table come to lie on an imaginary common line when the lower tool table reaches its upper reversing point. Thus it is advantageously ensured that in the upper reversing point of the lower tool, and thus in the closed condition of the forming tool, a maximum force is ensured by the drive mechanism owing to the linear force flux across all of the participating coupling members from the crankshaft drive mechanism to the lower tool table, so that losses of force can not occur or unfavorable conditions in terms of attacking forces can not manifest. This is particularly advantageous if in this position an additional impulse of a die-cutting stroke for producing a die-cutting movement is to be transmitted via these components.

In another preferred embodiment of the thermoforming apparatus in accordance with the invention, the eccentric shaft portion of the crankshaft drive mechanism is linked, preferably centrally, in the lower tool table through the intermediary of a connecting rod. This provides the advantage of direct force transmission from the crankshaft drive mechanism to the lower tool table. The multi-part toggle joint mechanisms known from the prior art may thus be avoided. Moreover this provides the advantage that a number of load-bearing components as small as possible may be calculated and optionally optimized with a view to optimum introduction and transmission of force, e.g., with the aid of finite-element methods. Thus it is also possible, as early as in the preparatory stage, to keep the development costs low.

In a further preferred variant of the thermoforming apparatus in accordance with the invention, the connecting rod has towards the lower tool table a Y-shaped cross-section so as to branch out into two arms and act on the lower tool table via two spaced-apart locations. This advantageously allows an optimum impression of the forces for moving the lower tool table without having to fear any inadmissible deformation or flexure of the lower tool table. By skillfully selecting the linking points it is possible to optimize the force flux in the lower tool table such that the latter will not suffer any flexure or deformation even when a maximum force is impressed for performing a die-cutting stroke.

In accordance with another preferred embodiment of the thermoforming apparatus of the invention, the crankshaft drive mechanism includes an electric servomotor. This provides the advantage of, e.g., programmable control or automatic control, so that the respective rotational characteristics of the servomotor may be adapted optimally to the respective application. Such optimization of the movement sequences is not possible with the cam disc drive mechanisms that are known from the prior art to constitute a drawback.

In a further preferred embodiment of the thermoforming apparatus it is moreover provided that the electric servomotor drives the crankshaft drive mechanism through the intermediary of a toothed belt via a pulley. This provides cost-efficient drive technology with well-tried components. In addition, gears, worm drives or the like are equally conceivable for force transmission from the servomotor to the crankshaft drive mechanism. Moreover the servomotor may act directly on the crank shaft. This provides the advantage of a highly compact design.

In a further preferred embodiment of a thermoforming apparatus in accordance with the invention, it is proposed for the first time that the lower tool table, when in a position removed from the upper tool, is capable of being rotated out of the frame of the thermoforming apparatus and associated with a stacking means, so that the lower tool table then faces the opposed stacking means, and optionally may also be approached towards and moved away from the latter.

This results not only in the advantages already discussed above, but in addition the lower tool may be aligned with the stacking means and approached towards it in such a way that the completed shaped bodies located in the lower tool may be transferred optimally, without any jamming and with the necessary repeating accuracy, to the stacking means which is then located in exact opposition. Rotatability of the rail assembly thus ensures that the lower tool is positioned in exact opposition with the stacking means and may accurately be aligned with it. The capability of linear or rectilinear movement of the lower tool table inside the rotatable rail assembly moreover provides the synergetic advantage that the lower tool may, e.g. through the intermediary of the crankshaft drive mechanism, be approached towards the stacking means and again moved away from the latter in a lifting or up-and-down movement so that, e.g. in the event of shaped bodies having different sizes, it is possible to additionally compensate for the distance to be covered by the shaped bodies out of the cavity of the lower tool and across to the stacking means. Particularly in combination with ejectors present in the lower tool, an optimum adaptation of the transfer movement of the shaped bodies out of the cavities of the lower tool into the associated reception points of the stacking means may thus be ensured.

It is another advantage that differently designed stacking means may in this way be utilized together with the thermoforming apparatus in accordance with the invention, so that it is possible to employ stacking means which are furthermore optimized with regard to the respective shaped bodies to be manufactured without any additional expenditure for adaptation.

In accordance with a further preferred embodiment of the thermoforming apparatus in accordance with the invention, ejector drive means for lifting and lowering ejectors movably arranged in the lower tool are arranged at the lower tool table, preferably between the two arms of the Y-shaped connecting rod which face the lower tool table. This provides on the one hand the advantage that ejection of the completed shaped bodies with the aid of the ejectors may be supported, and the shaped bodies may be furnished with an additional impulse of motion, so that they may readily cover the distance from the lower tool to the stacking means. On the other hand, arranging the ejector drive means underneath the lower tool table provides the additional advantage that the free construction space remaining there, for instance between the arms of the Y-shaped connecting rod, may be used optimally and thus a design of the thermoforming apparatus in accordance with the invention may be achieved which is as compact as possible.

In a further preferred variant of a thermoforming apparatus in accordance with the invention, it is proposed for the first time that second drive means are provided for lifting the lower tool table together with its drive means within the guide means linearly or rectilinearly guiding it, in a predetermined stroke for generating a die-cutting movement.

Thus, e.g. in combination with the crankshaft drive mechanism not only a high cycle frequency as such is ensured, but at the same time a high cycle frequency of the die-cutting stroke generating the die-cutting movement is moreover possible. Die-cutting strokes may thus advantageously be performed in less than ⅒ of a second. By lifting the lower tool table within its rectilinear guidance for generating the die-cutting movement, it is advantageously ensured that the lower tool will always matingly co-operate with the upper tool, so that jamming or the like is precluded even during die-cutting, and thus an undesirable wear of the cutting edges is avoided. Moreover it is ensured that in this manner the substantially higher forces for a die-cutting stroke in comparison with the cutting or squeezing movements known from the prior art may readily be transmitted to the lower tool table in a substantially shorter time. Furthermore it is ensured that these forces may be transmitted to the lower tool table not only rapidly, i.e., during a short period of time, but also with a high repeating frequency, so that altogether a high cycle frequency of the thermoforming apparatus in accordance with the invention may be attained as regards both the shaping cycles for closing and opening the forming tool, and also the die-cutting cycles for trimming out the shaped bodies in the closed condition of the forming tool.

In correspondence with another preferred embodiment of the thermoforming apparatus in accordance with the invention, the second drive means for generating the die-cutting stroke include a hydraulically driven lifting cylinder. This provides the advantage that in comparison with conventional cam disc drive mechanisms and also in comparison with the advantageous crank drive mechanism of the thermoforming apparatus in accordance with the invention for driving the lower tool table, it is possible to impress even far higher forces to the lower tool table in substantially shorter force development times, so that an optimum die-cutting impulse may be achieved through the selection of a hydraulic die-cutting drive mechanism. Furthermore a hydraulic drive mechanism permits optimum regulation similar to the crankshaft drive mechanism driven through the intermediary of an electric servomotor, accordingly allows for automatic process management, and thus may be harmonized optimally with the crankshaft drive mechanism. Hereby it is advantageously ensured that the die-cutting stroke will always be impressed precisely when the lower tool is in the upper reversing point and the forming tool accordingly is in the closed condition.

In accordance with a further preferred embodiment, the stroke of the second drive means is about 3 mm to 10 mm, preferably 5 mm to 8 mm, in a particularly preferred manner 1.1 to 1.3 times the thickness of a plastic sheet. This ensures optimum die-cutting results upon trimming the completed shaped bodies from the plastic sheet clamped between the upper and lower tools. At the same time, particularly clean rims and die-cut edges are thus achieved at the rims of the die-cut shaped bodies, so that the rims of the shaped bodies need not be subjected to an additional finishing step such as for application of a lid or the like.

A method for producing shaped bodies of plastic sheet, such as cups, containers, lids, secondary packagings for foodstuffs or the like with the aid of a thermoforming apparatus of the general type as known in the prior art is being proposed, which method comprises the following steps: a) closing the forming tool by guiding the movable lower tool table through the intermediary of the guide means and driving it through the intermediary of the drive means such that it is approached towards the upper tool table, b) producing the shaped bodies in the closed condition of the forming tool, c) opening the forming tool by guiding the movable lower tool table through the intermediary of the guide means and driving it through the intermediary of the drive means such that it is moved away from the upper tool table, and d) ejecting the shaped bodies, optionally into a stacking means. In accordance with the invention it is here proposed for the first time that the lower tool table is guided rectilinearly through the intermediary of a rotatable guide rail assembly for closing and opening the forming tool, and rotated together with it for ejecting the shaped bodies. This serves to achieve the advantages and synergy effects already discussed above.

In a preferred development of the method in accordance with the invention, the lower tool table is driven through the intermediary of drive means having the form of a crankshaft drive mechanism. The advantages and synergy effects thus attainable have already been discussed above. In accordance with another preferred development of the method in accordance with the invention, the lower tool table, when in a position removed from the upper tool table, is rotated with the rotatable rail assembly out of the frame of the thermoforming apparatus and associated to a stacking means, so that the lower tool table faces the stacking means then having an opposed position, and optionally may also be approached towards and moved away from the latter. Moreover in accordance with a further preferred embodiment of the method in accordance with the invention, the lower tool table with its drive means is raised and again lowered within the guide means rectilinearly guiding it through the intermediary of second drive means, for generating a die-cutting movement with a predetermined die-cutting stroke. The advantages and synergy effects in this regard have also already been discussed above.

The invention shall in the following be explained in more detail by way of embodiments while referring to the figures of the drawing, wherein.

Figure 1:
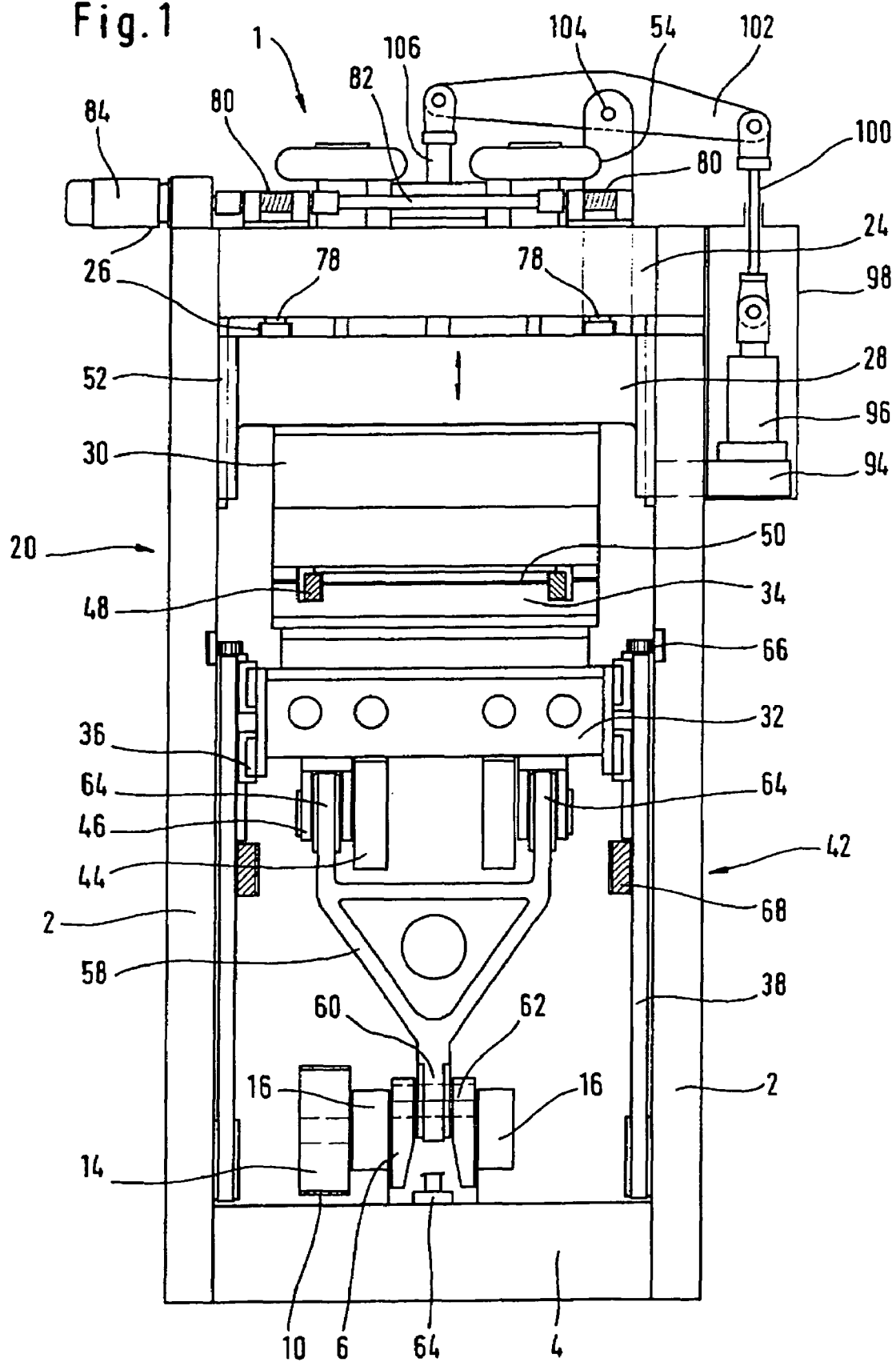
FIG. 1 is a front view of an embodiment of a thermoforming apparatus in accordance with the invention.

FIG. 1 represents an exemplary embodiment of a thermoforming apparatus 1 in accordance with the invention in a front view. The movable component groups of the thermoforming apparatus 1 are arranged in a stand 2. The stand 2 may, for instance, be constructed in the form of stand panels of sheet steel which are stress-relieved by annealing. A cross-member 4 arranged underneath, i.e., near the ground, connects the stand panels 2 and at the same time serves as a bed for the bearings of the crankshaft drive mechanism 6. The crankshaft drive mechanism 6 is in the presently represented variant driven by an electric servomotor 8. The drive force of the latter is transmitted via a belt 10 and pulleys 12 and 14, which is more clearly visible particularly in the side view of FIG. 2. In the presently represented variant, the crankshaft drive mechanism 6 is mounted symmetrically on both sides in relatively short lever arms 16, with the lever arms 16 in turn being linked to a bracket 18 mounted on the cross-member 4.

Figure 2:
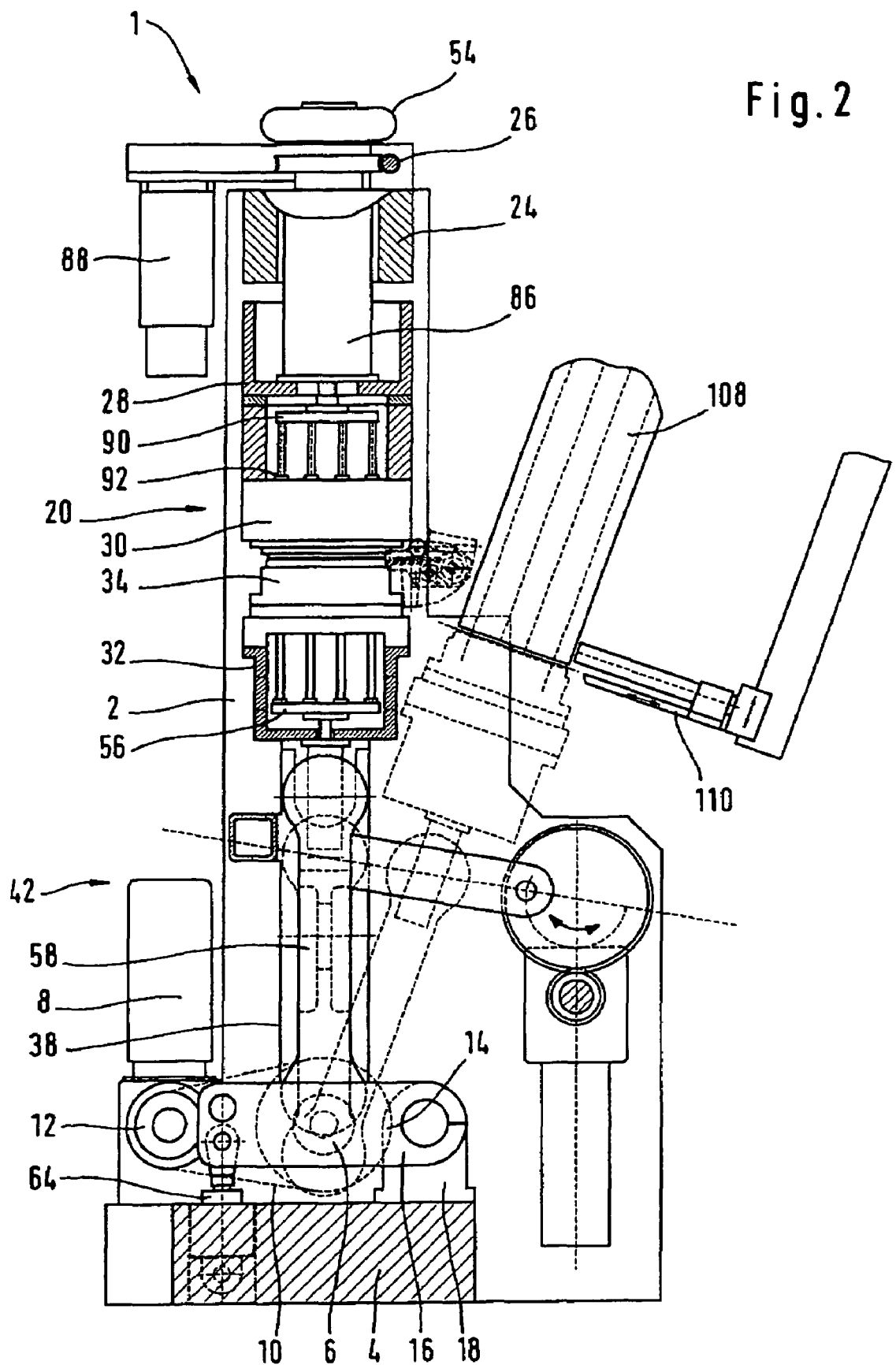
FIG. 2 is a side view of the exemplary embodiment of a thermoforming apparatus in accordance with the invention as represented in FIG. 1.

Both in FIG. 1 and in FIG. 2, the two-part forming tool 20 of the forming station of the thermoforming apparatus 1 is represented in the closed condition approximately in the center of the drawing. A cross-member 24 visible in the upper section of FIG. 1 and FIG. 2 connects the two stand panels 2 above the two-part forming tool 20 and serves as a base for a drive mechanism 26 for adjusting the position of the upper tool table 28 with the upper tool 30 attached thereto. The drive mechanism 26 for adjusting the position of the upper tool table 28 may, e.g., have the form of a precision lifting mechanism with backlash compensation. A lower tool table 32 supports the lower tool 34 and is arranged between the rotatable guide rails 38 of the rotatable guide rail assembly 40 (cf. FIGS. 3 and 4) of the guide means 42 through the intermediary of correspondingly designed linear guides 36. At the underside or bottom of the lower tool table 32, ejector cylinders 44 and the upper connecting rod bearings 46 are attached.

Between the upper tool 30 and the lower tool 34 of the forming tool 20 represented in the closed condition in FIGS. 1 and 2, a chain transport means 48 is shown whereby the plastic sheet 50 is supplied to the two-part forming tool 20 and transported off following forming and trimming out of the shaped bodies that are not shown here any more, with the plastic sheet 50 being tensioned by correspondingly suitable means in the range of the two-part forming tool 20, preferably bidirectionally.

The upper tool table 28 is guided in correspondingly designed linear guides 52 between the stand panels 2. The lower tool 34 may, e.g., have a mounting surface of 490 mm×1040 mm. Thus, e.g., four rows of eight cavities each for 32 shaped bodies may be realized at a diameter of the shaped bodies of about 75 mm. This amounts to a total die-cutting length of all edges to be severed of 7640 mm, necessitating a total die-cutting force of about 400 kN.

The upper tool 30 is fastened to the upper tool table 28, for example with the aid of spacers (not shown). Guide rails (not shown) facilitate mounting of the tools. A backlash compensation 54 serves for compensating play, e.g., during precision lifting 26 of the upper tool table 28. The linear guides 36 for the lower tool table 32 have a play-free adjustment and ensure accurate guiding of the lower tool 34. The linear guides 52 of the upper tool table 28 include slideways (not shown) which may be adjusted without play.

The ejector drive means 44, positioned underneath the lower tool table 32, for the ejectors 56 visible in FIG. 2 in a fragmentary sectional view, include two pneumatic cylinders with stroke-arresting means.

The connecting rod 58 driven by the crankshaft drive mechanism 6, which may also be referred to as a driving rod for driving the lifting stroke of the lower tool table 32, has the form of a triangle or of a Y in the presently represented variant. The connecting rod 58 is linked to the eccentric shaft portion 62 of the crankshaft drive mechanism 6 through a first connecting rod portion 60. The two upwardly directed arms 64 of the Y-shaped connecting rod 58 in the views of FIGS. 1 and 2 are linked to the connecting rod bearings 46 of the lower tool table 32. These two upper connecting rod bearings 46 here have an arrangement, if possible, where a flexure of the lower tool table 32 as well as its proper weight may be kept as low as possible. The Y-shaped connecting rod 58 advantageously has only one bearing at the lower connecting rod portion 60 of the presently represented variant, so that even one crank drive mechanism is sufficient.

As was already explained in the foregoing, the crankshaft drive mechanism 6 is mounted in two locations so as to better resist flexure. The respective crank bearings may be split for the purpose of easier mounting. The crankshaft drive mechanism 6 is centrally mounted in lever arms 16 forming a kind of double rocker. The latter in turn is mounted on the cross-member 4 by its right side through the intermediary of the bracket 18. On the left side of this double rocker, the die-cutting drive mechanism 64 attacks. The die-cutting drive mechanism 64 consists, e.g., of a hydraulic cylinder and an associated hydraulic system for generating with the aid of the hydraulic cylinder an abrupt cutting stroke that is transmitted via the double rocker 16, the crankshaft drive mechanism 6, the connecting rod 58, and the bearings 46 to the lower tool table 32 and thus to the lower tool 34.

The drive mechanism of the crankshaft drive mechanism 6 may—as was already mentioned above—include as the lifting drive mechanism a servomotor 8 which acts on the crankshaft drive mechanism 6 via transmission, toothed belt, ladder chain drive, or the like with little play. Closing and opening of the two-part forming tool 20 then correspond to respective 180-degree rotations at the crank shaft.

Figure 3:
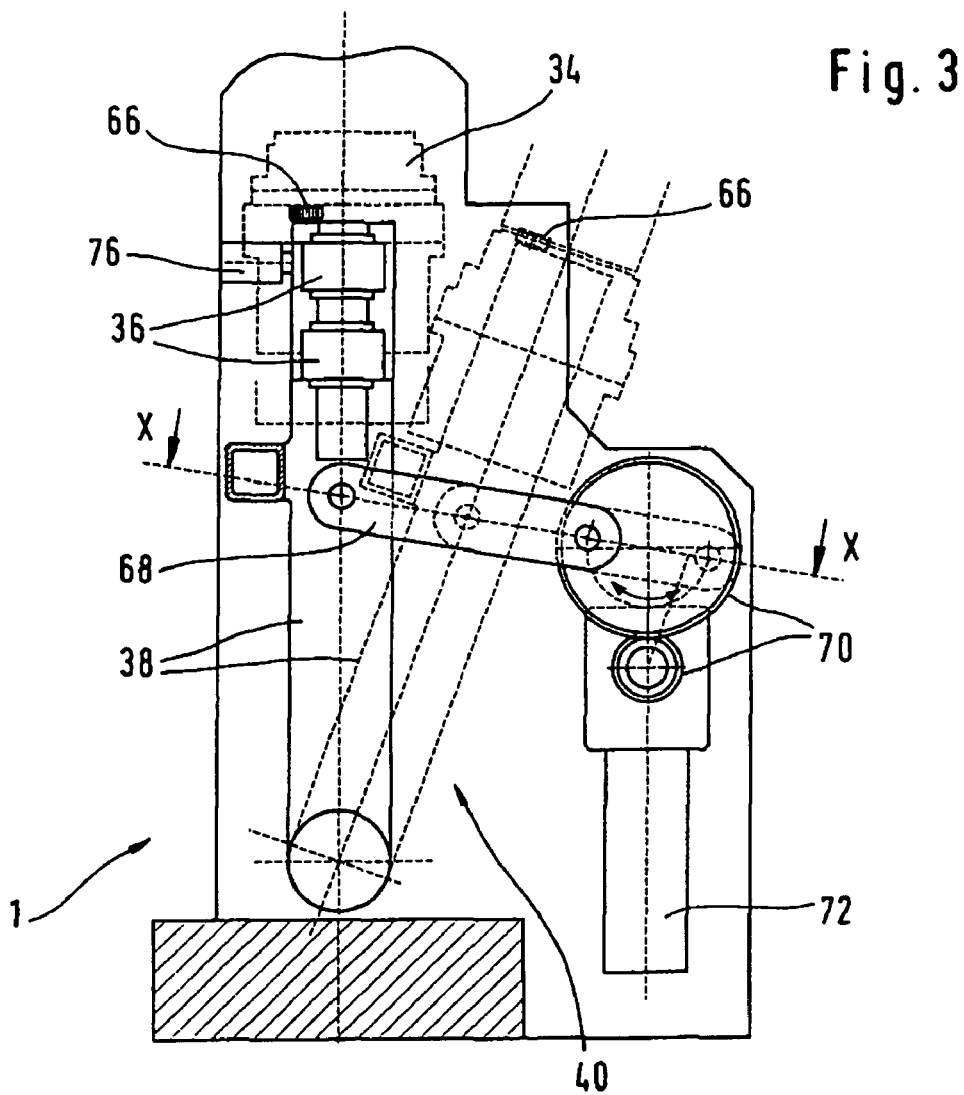
FIG. 3 is a laterally viewed detail of the drive mechanism for rotating the guide rail assembly of the variant of a thermoforming apparatus in accordance with the invention as shown in FIGS. 1 and 2.
Figure 4:
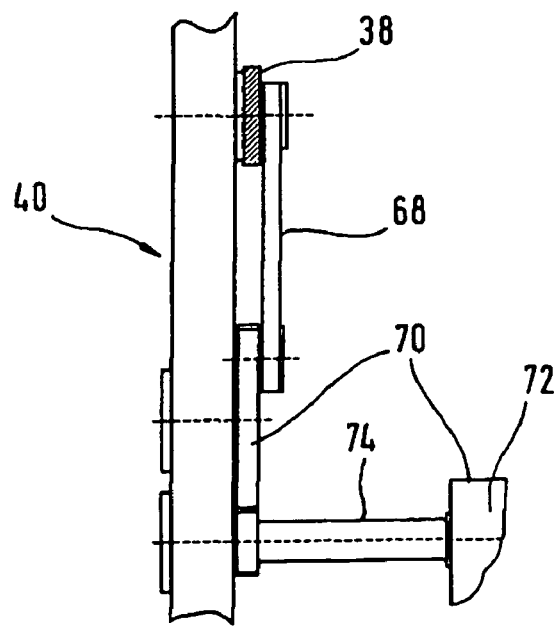
FIG. 4 is a sectional view along line X-X of FIG. 3.
Figure 5:
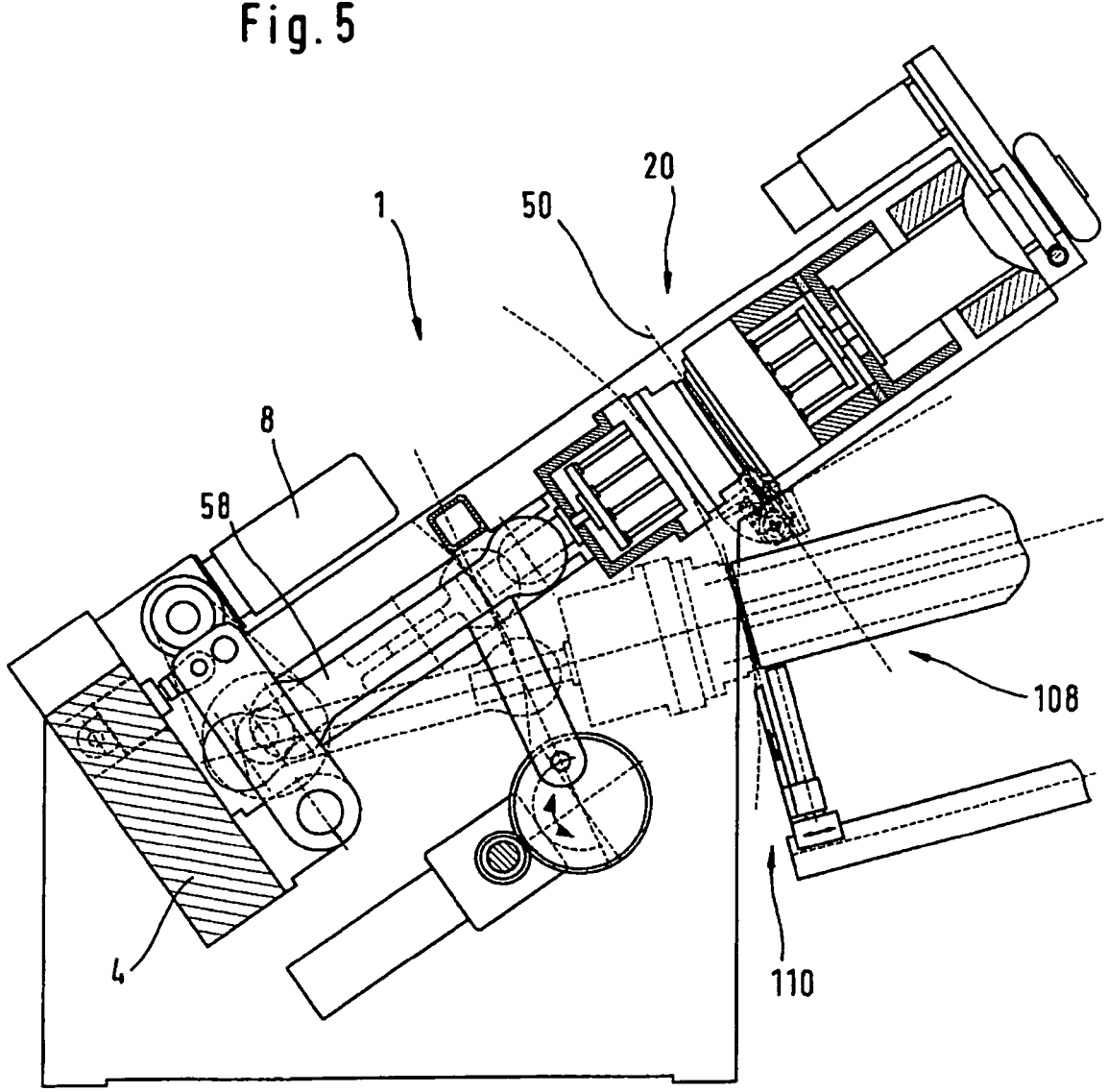
FIG. 5 represents the variant shown in FIGS. 1 through 4 in an obliquely positioned operational arrangement.

The pivoted levers 38 for rotatably accommodating the lower tool table 32, which were already represented in FIGS. 1 and 2, include in the presently represented variant, e.g., the pivoted lever lateral guides 66 having the form of cam rollers as represented in FIG. 3. The lateral guide members 66 of the pivoted levers 38 having, e.g., the form of cam rollers, run on hardened rails (not shown) and may be adjusted free from play for accurately guiding the lower tool 34.

As a drive mechanism for rotating the rotatable guide rails 38 of the rotatable guide rail assembly 40, one driving rod 68 each is provided on either side of the lower tool table 32. As a drive mechanism 70 for generating the rotating movement of the lower tool 34 via the rotatable guide rails 38, it is possible to provide a driving rod pivotal drive mechanism 68 acting on both guide rails 38 which may be driven, e.g., by a geared servomotor 72 and a synchronized shaft 74. These details are represented more closely in FIG. 4 which shows a sectional view along line X-X of FIG. 3.

In order to limit the rotating movement into the frame, or into the stand 2, a pivoted lever stop 76 in accordance with the representation of FIG. 3 is provided. This stop 76 for the pivoted lever 38 may be adjusted for accurately positioning the lower tool 32.

The drive mechanism 84 for adjusting the upper tool table 28, which may, e.g., have the form of a precision drive, serves not only for adjusting the die-cutting stroke, for example, but may also be employed for activation or deactivation of the die-cutting stroke. Two threaded spindles 78 barely visible in FIGS. 1 and 2 are driven, e.g., through worm gears 80 via a synchronized shaft 82 through the intermediary of a geared motor 84.

In the presently represented variant in accordance with FIGS. 1 to 5, two backlash compensations 54 exemplarily having the form of pneumatic bellows cylinders are capable of drawing the upper tool table 28 upwardly through the intermediary of drawbars (not shown) so as to compensate for backlash between spindle and nut.

As is represented more closely in FIG. 2, a pre-stretch unit 86 is provided. The presently represented variant of the pre-stretch unit 86 includes, i.a., a pre-stretch means drive mechanism 88 having the form of a servomotor, which is coupled to the pre-stretch means plate 90 and the pre-stretch means 92 arranged thereon via a toothed belt drive not shown in FIG. 2 and a planetary roller threaded drive and the nut thereof through releasable connections. This pre-stretch means drive mechanism may also include a highly dynamic servomotor 88.

In the variant of the pre-stretch means drive mechanism of the pre-stretch unit 86 shown more closely in FIG. 1, the latter may include a console 94 supporting a hydraulic cylinder 96 as the pre-stretch means drive mechanism. The hydraulic cylinder 96 is linearly displaced with the console 94 together with the upper tool table 28 while stationary relative to the latter. The distance between the hydraulic cylinder 96 and the upper tool table 28 thus remains permanently constant. The hydraulic cylinder 96 is encapsulated by a housing 98, so that hydraulic oil cannot spill even in the event of minor leakages. A thrust bar 100 is linked to the hydraulic cylinder 96 in accordance with the representation in FIG. 1, and in the presently represented variant its one end facing away from the hydraulic cylinder 96 is linked to the right end of a rocking lever 102. The rocking lever 102 is pivoted through the intermediary of a bearing mount 104. The bearing mount 104 in turn attacks at the upper tool table 28 via a suitable bracket. At the left end of the rocking lever 102, the pre-stretch means rod 106 is linked which is connected with the pre-stretch means plate 90 and the pre-stretch means 92 attached to the latter. The hydraulic cylinder 96 for driving the pre-stretch means 92 may include a servo control containing a programmable control for the stroke of the cylinder 96. The necessary hydraulic unit may be positioned inside the bottom part of the machine. The pre-stretch means rod 106 may be connected with the pre-stretch means plate 90 in the upper tool 30 via a compensating coupling. The housing 98 for the hydraulic cylinder 96 not only serves for entrapping any leakages, but may also support the servo control and moreover contain sensors or the like in order to report any occurring leakages, and may be provided with means for discharging such leakages. The same also applies to the hydraulic conduits.

In accordance with the representation of FIG. 2, the thermoforming apparatus 1 of the invention may be associated with a stacking means 108 for receiving, stacking and transporting the completed shaped bodies following ejection from the cavities of the lower tool 34. For this purpose, the stacking means 108 may include, e.g., a catcher 110 for transporting off the ejected shaped bodies.

Figure 6:
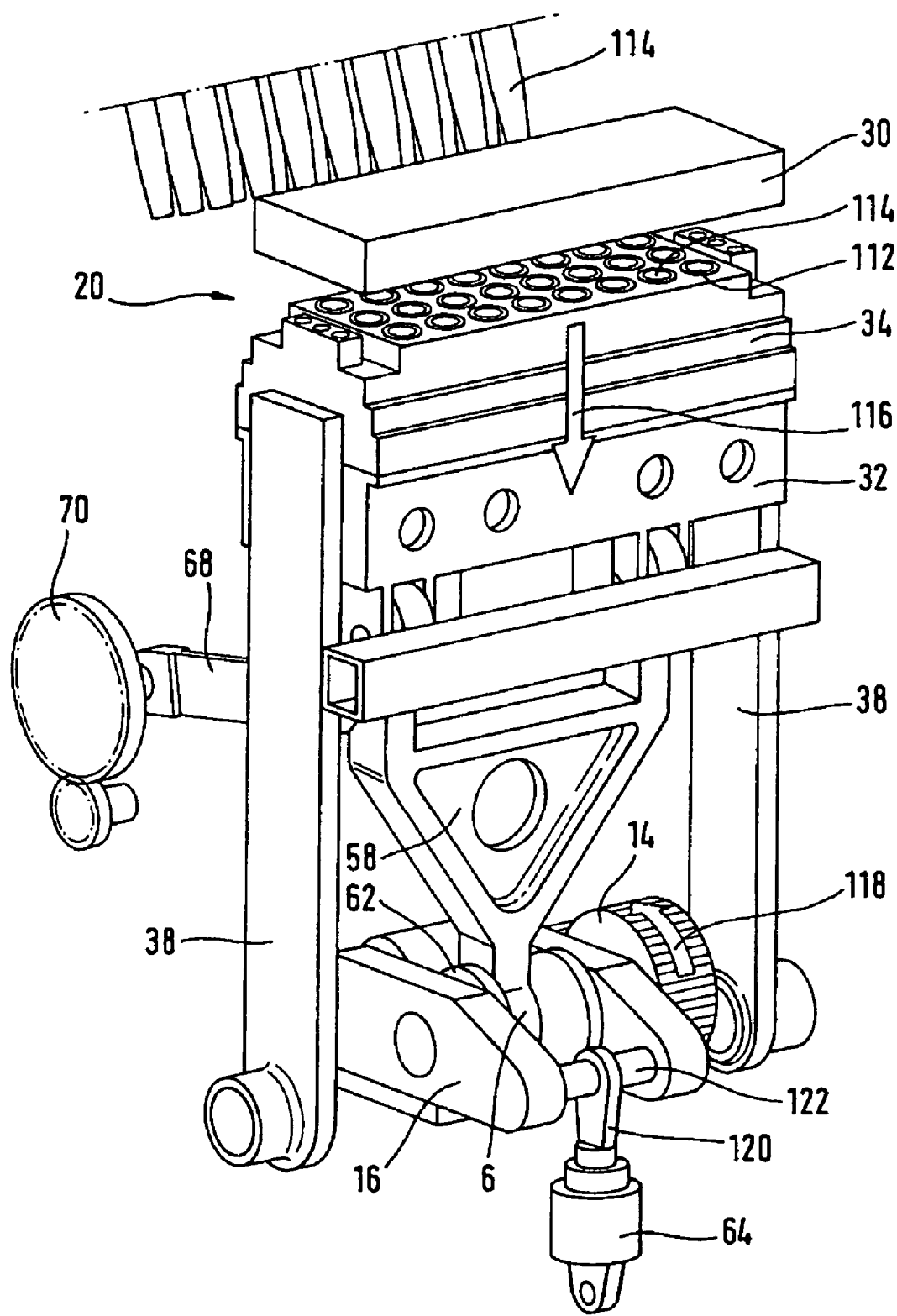
FIG. 6 is a three-dimensional, schematically simplified view of the movable component groups of an exemplary embodiment of a thermoforming apparatus in accordance with the invention, with arrows symbolizing the linear lifting movement of the lower tool table.
Figure 7:
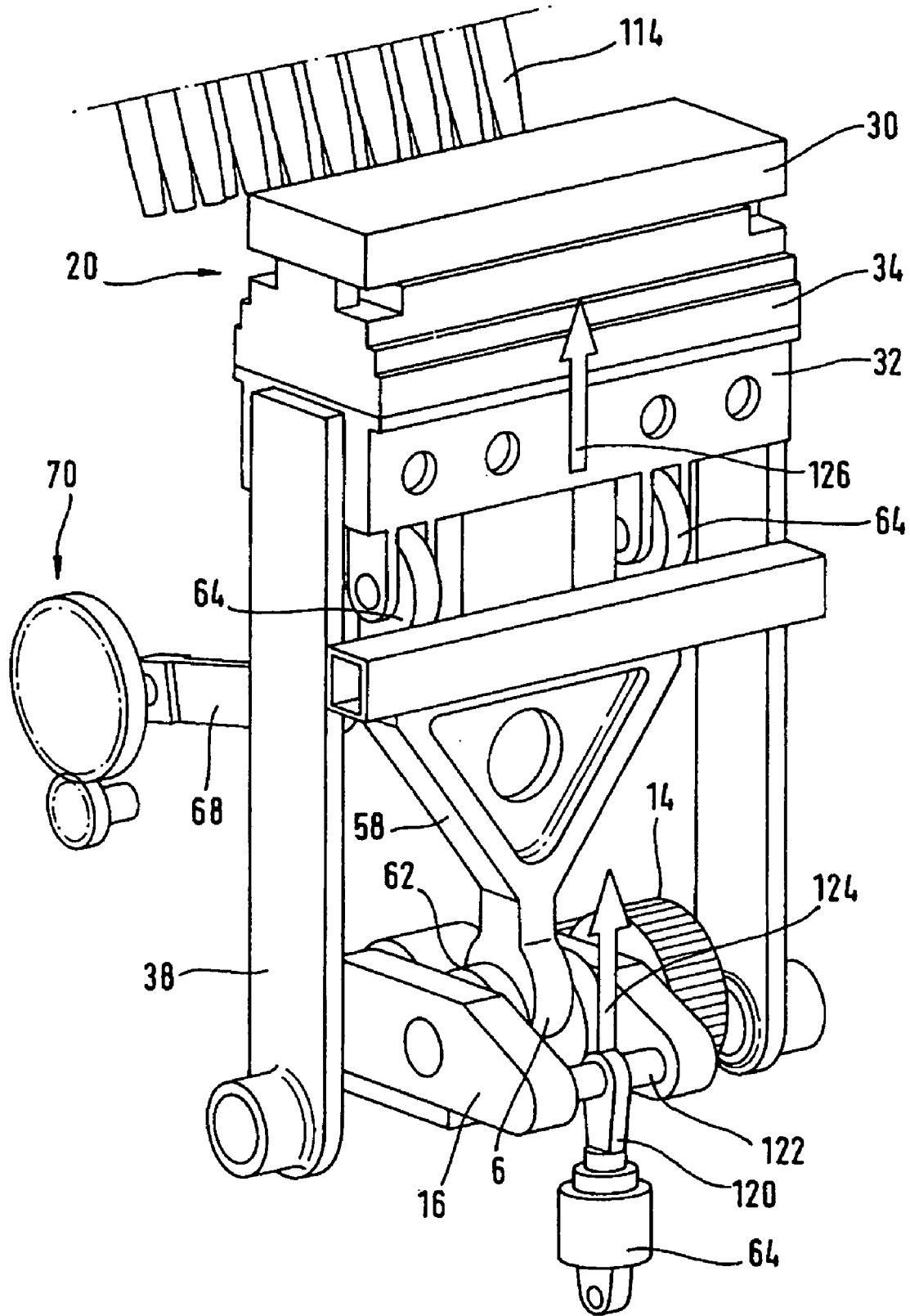
FIG. 7 is a three-dimensional, schematically simplified view of the variant shown in FIG. 6, with different arrows symbolizing the die-cutting movement of the lower tool table.
Figure 8:
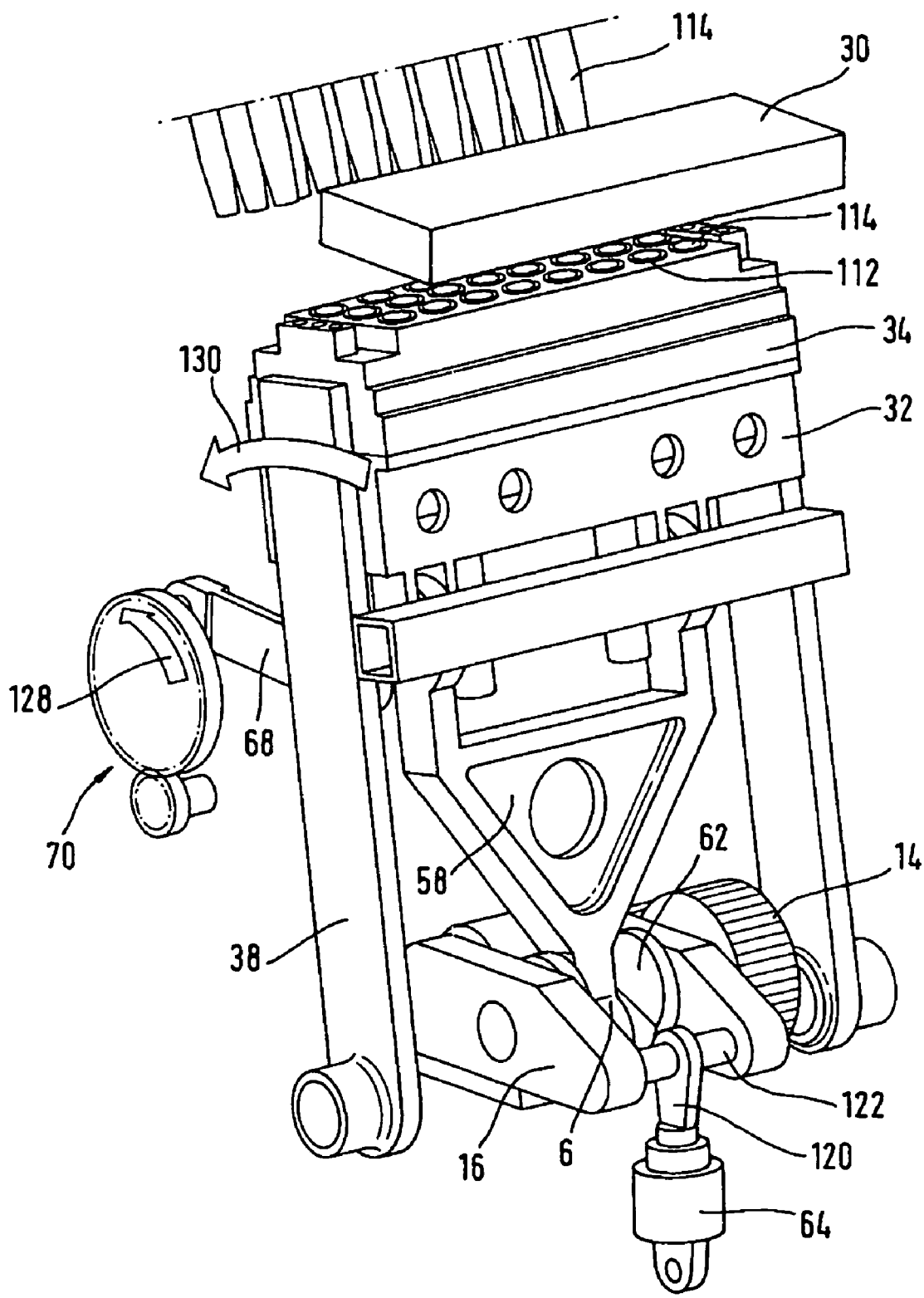
FIG. 8 is a three-dimensional, schematically simplified view of the variant shown in FIGS. 6 and 7, again with different arrows symbolizing the movement upon rotation of the guide rail assembly.

The exemplary embodiment of a thermoforming apparatus 1 in accordance with the invention and represented in FIGS. 1 to 5 is shown in FIGS. 6 to 8 in a schematically simplified manner in three-dimensional views for visualizing the moving sequences while being reduced to the essential moved components. For convenience, identical components or components having an identical or similar action will be provided with the same reference symbols as discussed above.

In FIG. 6 the generation of the lifting movement of the lower tool 32 is represented in a schematically simplified manner. In the position represented there, the lower tool 32 is removed from the upper tool 30. Three rows of eight cavities 112 each with the completed shaped bodies 114 contained in them are visible. The arrow 116 symbolizes the linear movement of the lower tool 34, or lower tool table 32, which is here directed downwards. The tool table 32 is linearly guided between the rotatable guide rails 38. The arrow 118 symbolizes the servo-electric drive mechanism for the rectilinear movement of the lower tool 34 relative to the rotatable guide rail 38.

The die-cutting cylinder 64 is connected with the two lever arms 16 forming a double rocker via a thrust/draw rod 120 and a thrust/draw shaft 122, in order to transmit a cutting stroke—indicated by arrows 124 and 126 in FIG. 7—to the lower tool 34. Hereby the completed shaped bodies 114 may be die-cut from the plastic sheet 50 (not shown). In the schematically simplified variant represented in FIG. 7, the hydraulic drive mechanism for die-cutting is operated while the eccentric shaft portion 62 of the crankshaft drive mechanism 6 and the rotational drive mechanism 70 are stationary.

The crankshaft drive mechanism 6 transmits the moving force for lifting and lowering the lower tool table 32, or for opening and closing the forming tool 20, to the lower tool table 32 through the intermediary of a connecting rod 58 having a Y shape in this representation. The two upper arms 64 of the connecting rod 58 have a small support width.

As discussed above, FIG. 7 represents in a schematically simplified manner the generation of the cutting stroke. Accordingly, FIG. 8 shows in a schematically simplified manner the generation of the rotating movement.

Here a servo-electric drive mechanism 70 serves for generating the rotating movement of the rotatable guide rail 38 with the lower tool 34 rectilinearly or linearly guided in it. This is symbolized by the arrows 128 and 130.

The present invention for the first time advantageously proposes a thermoforming apparatus for producing shaped bodies of plastic sheet, such as cups, containers, lids, secondary packagings for foodstuffs or the like, comprising a forming station with a two-part forming tool. The two-part forming tool comprises an upper tool table adapted to be adjustably fixed and having an upper tool with pre-stretch means movably mounted therein, and a movable lower tool table having a lower tool with cavities. The movable lower tool table is guided through the intermediary of guide means and capable of being approached to the upper tool table and moved away from it by drive means. In accordance with the invention, the guide means for the first time include a rotatable guide rail assembly whereby the lower tool table may be guided rectilinearly and rotated together with it. Furthermore the present invention relates to a method for producing the shaped bodies of plastic sheet.

Besides the advantages and aspects of the thermoforming apparatus in accordance with the invention that were already discussed in the foregoing, it provides the following additional advantages:

The lower tool and the lower tool table do not perform a rotating movement but only a linear movement when the forming tool is opened and closed. This ensures more accurate guiding of the tool table in comparison with the prior art. In addition, masses may be managed substantially better in a linear movement than in a rotation which may generate rotary oscillations that can only be managed with difficulty. In the disadvantageous cam discs known from the prior art, such changing inertial forces necessitated additional complementary cam discs, which brought about an additional increased complexity of construction. The crank drive mechanism proposed for the thermoforming apparatus in accordance with the invention, on the other hand, may absorb inertia forces in both directions which thus already may be managed more easily. In addition, through the intermediary of the crankshaft drive mechanism a fast sinusoidal velocity profile is generated. This provides the further advantage that there are no abrupt accelerations or decelerations of the lower tool. As the connecting or driving rod has a triangular or Y shape and attacks underneath the lower tool, this advantageously results not only in a small flexure of the lower tool table approaching zero, but moreover advantageously even a single crankshaft drive mechanism is sufficient. This advantageously helps reduce the number of components and thus reduce costs. For ejecting the shaped bodies, the lower tool is rotated at a large radius through the intermediary of the rotatable guide rail assembly. Not only does this provide the advantages already discussed in the foregoing, but the so-called catcher plate may be omitted that is frequently felt to be a drawback in the prior art. Moreover the stacking means or its stacking basket, respectively, may be designed to be stationary. This in turn advantageously results in a simplified construction. Furthermore the separate hydraulic die-cutting drive mechanism, in contrast with the disadvantageous cam discs with die-cutting cams as known from the prior art, generates a an abrupt cutting movement, as it were. This advantageously results in prolonged service life times of the tools. It is another advantage that with the abrupt die-cutting movement, die-cutting times may not only be less than $1/10$ s but even less than 30 ms.

With the thermoforming apparatus in accordance with the invention it is possible to process plastic sheets of PP, PS, PE, PET, ABS or PVC. The plastic sheet supplied to the thermoforming apparatus as a sheet web may have a sheet web width of at least 250 mm to 750 mm, at a sheet web thickness of at least 0.3 mm to 4 mm. The available forming area between the upper and lower tools is at least 700 mm×450 mm. The maximum clamping force is at least 400 kN at a maximum cutting length of at least 8400 mm.

LIST OF REFERENCE SYMBOLS 1 thermoforming apparatus
2 mount or frame
4 lower cross-member
6 crankshaft drive mechanism
8 electric servomotor
10 belt
12 pulley
14 pulley
16 lever arm
18 bracket
20 two-part forming tool
22
24 upper cross-member
26 upper tool drive mechanism adjustment
28 upper tool table
30 upper tool
32 lower tool table
34 lower tool
36 lower tool table linear guide means
38 rotatable guide rails
40 guide rail assembly
42 guide means
44 ejector drive means
46 connecting rod bearing
48 chain transport means
50 plastic sheet
52 upper tool table linear guide means
54 backlash compensation
56 ejector
58 connecting rod
60 first connecting rod portion
62 eccentric shaft portion
64 die-cutting drive mechanism
66 pivoted lever lateral guides
68 driving rod pivotal drive mechanism
70 rotational drive mechanism
72 geared servomotor
74 synchronized shaft
76 pivoted lever stop
78 threaded spindle
80 worm gear
82 synchronized shaft
84 geared motor
86 pre-stretch unit
88 pre-stretch means drive mechanism
90 pre-stretch means plate
92 pre-stretch means
94 console for pre-stretch means drive mechanism
96 hydraulic pre-stretch cylinder
98 housing
100 thrust bar
102 rocking lever
104 rocking lever bearing mount
106 pre-stretch means rod
108 stacking means
110 catcher
112 cavities
114 shaped bodies
116 arrow symbolizes linear movement
118 arrow symbolizes rotating crank drive mechanism
120 thrust/draw rod
122 thrust/draw shaft
124 arrow symbolizes die-cutting stroke 126 arrow symbolizes die-cutting movement
128 arrow symbolizes rotary drive
130 arrow symbolizes rotation

The invention claimed is:

1. A thermoforming apparatus for producing shaped bodies of plastic sheet, such as cups, containers, lids, secondary packaging for foodstuffs or the like, comprising a forming station with a two-part forming tool, wherein the two-part forming tool comprises an upper tool table adapted to be adjustably fixed and having an upper tool with pre-stretch means movably mounted therein, and a movable lower tool table having a lower tool with cavities, wherein said movable lower tool table is guided through the intermediary of guide means and capable of being approached to said upper tool table and moved away from it by first drive means, wherein said guide means include a rotatable guide rail assembly whereby said lower tool table may be guided rectilinearly and rotated together with said guide rail assembly, and wherein the rotatable guide rail assembly includes two guide rails, pivot-mounted on a frame of the thermoforming apparatus, with the lower tool table being guided movably between those, in a rectilinear manner, to be approached towards the upper tool table and moved away from the latter, characterized in that said first drive means for said lower tool table have the form of a crankshaft drive mechanism, said eccentric shaft portion of said crankshaft drive mechanism is linked, preferably centrally, to said lower table through the intermediary of a connecting rod, said crankshaft drive mechanism are positioned inside said frame of said thermoforming apparatus at a side of said lower tool table facing away from said upper tool table such that the center point of the crankshaft axis, the center point of the eccentric axis portion thereof in the upper reversing point, the linking points of said rotatable guide rails, and the linking points at said lower tool table come to lie on an imaginary common straight line when the latter reaches its upper reversing point, said lower tool table is capable of being lifted by second drive means together with its first drive means within said guide means rectilinearly guiding it in a predetermined stroke for generating a die-cutting movement, and ejector drive means for lifting and lowering ejectors movably arranged in said lower tool are arranged at said lower tool table.

2. The thermoforming apparatus in accordance with claim 1, wherein said connecting rod has towards said lower tool table a Y-shaped cross-section so as to branch out into two arms and thus act on said lower tool table via two spaced-apart locations.

3. The thermoforming apparatus in accordance with claim 1, wherein said crankshaft drive mechanism includes an electric servomotor.

4. The thermoforming apparatus in accordance with claim 3, wherein said electric servomotor drives said crankshaft drive mechanism through the intermediary of a toothed belt via pulleys.

5. The thermoforming apparatus in accordance with claim 1, wherein said lower tool table, when in a position removed from said upper tool table, is capable of being rotated out of said frame of said thermoforming apparatus together with said rotatable rail assembly and associated with a stacking means, so that said lower tool table then faces said opposed stacking means, and is approached towards and moved away from the latter.

6. The thermoforming apparatus in accordance with claim 2, wherein ejector drive means are arranged between said two arms of said Y-shaped connecting rod which face said lower tool table.

7. The thermoforming apparatus in accordance with claim 1, wherein said second drive means for generating the die-cutting stroke include a hydraulically driven lifting cylinder.

8. The thermoforming apparatus in accordance with claim 1, wherein the stroke of said second drive means is about 3 mm to 10 mm.

9. Method for producing shaped bodies, such as cups, containers, lids, secondary packaging for foodstuffs or the like of plastic sheet, with the aid of a thermoforming apparatus for producing shaped bodies of plastic sheet, such as cups, containers, lids, secondary packaging for foodstuffs or the like, the thermoforming apparatus comprising a forming station with a two-part forming tool, wherein the two-part forming tool comprises an upper tool table adapted to be adjustably fixed and having an upper tool with pre-stretch means movably mounted therein, and a movable lower tool table having a lower tool with cavities, wherein said movable lower tool table is guided through the intermediary of guide means and capable of being approached to said upper tool table and moved away from it by first drive means, wherein said guide means include a rotatable guide rail assembly whereby said lower tool table may be guided rectilinearly and rotated together with said guide rail assembly, and wherein the rotatable guide rail assembly includes two guide rails, pivot-mounted on a frame of the thermoforming apparatus, with the lower tool table being guided movably between those, in a rectilinear manner, to be approached towards the upper tool table and moved away from the latter, comprising:

the following steps:

providing the thermoforming apparatus;

feeding said plastic sheet into said forming tool;

tightening said plastic sheet;

closing said forming tool by guiding said movable lower tool table through the intermediary of said guide means and driving it through the intermediary of said drive means such that it is approached towards said upper tool table, wherein said lower tool table is driven through the intermediary of first drive means having the form of a crankshaft drive mechanism, producing the shaped bodies in the closed condition of said forming tool, wherein said lower tool table being lifted and lowered with its drive means within said guide means rectilinearly guiding it, by said second drive means, in a predetermined stroke for generating a die-cutting movement, opening said forming tool by guiding said movable lower tool table through the intermediary of said guide means and driving it through the intermediary of said first drive means such that the it is moved away from said upper tool table, ejecting the shaped bodies, optionally into a stacking means, wherein said lower tool table being guided rectilinearly through the intermediary of a rotatable guide rail assembly for closing and opening said forming tool, and rotated together with said guide rail assembly for ejecting the shaped bodies.

10. The method in accordance with claim 9, wherein said lower tool table, when in a position removed from said upper tool table, is rotated with said rotatable rail assembly out of said frame of said thermoforming apparatus and associated to a stacking means, so that said lower tool table faces said opposed stacking means then having an opposed position, and is approached towards and moved away from the latter.

11. The method in accordance with claim 9, wherein said lower tool table with its drive means is raised and lowered again within said guide means rectilinearly guiding it through the intermediary of second drive means, for generating a die-cutting movement with a predetermined die-cutting stroke.

12. The method in accordance with claim 9, wherein said guide means include a rotatable guide rail assembly whereby said lower tool table may be guided rectilinearly and rotated together with said guide assembly.

13. The method according to claim 9, wherein said rotatable guide rail assembly of said guide means includes two rotatable guide rails linked to a frame of said thermoforming apparatus, between which said lower tool table is guided so as to be capable of being rectilinearly approached towards said upper tool table and moved away from it.

14. The thermoforming apparatus in accordance with claim 1, wherein the stroke of said second drive means is about 5 mm to 8 mm.

15. The thermoforming apparatus in accordance with claim 1, wherein the stroke of said second drive means is about 1.1 to 1.3 times the thickness of a plastic sheet.

\* \* \* \* \*